United States Patent [19]
See et al.

[11] Patent Number: 6,070,243
[45] Date of Patent: *May 30, 2000

[54] DETERMINISTIC USER AUTHENTICATION SERVICE FOR COMMUNICATION NETWORK

[75] Inventors: Michael E. See, Chapel Hill, N.C.; John W. Bailey, Agoura Hills, Calif.; Charles L. Panza, Park City, Utah; Yuri Pikover; Geoffrey C. Stone, both of Malibu, Calif.

[73] Assignee: Xylan Corporation, Calabasas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,754

[22] Filed: Jun. 13, 1997

[51] Int. Cl.$^7$ ................................................. G06F 11/00
[52] U.S. Cl. ................................................. 713/201; 380/23
[58] Field of Search ............................... 395/187.01, 180, 395/182.02, 186, 188, 413, 200.1, 200.11–200.2; 380/374, 25, 23, 42–95, 49, 50, 3, 4; 364/222.2, 222.4, 222.5; 371/67.1, 68.2; 379/88, 188, 197; 370/60, 94.1; 713/201, 200, 202

[56] References Cited

U.S. PATENT DOCUMENTS

| | | |
|---|---|---|
| 4,896,319 | 1/1990 | Lidinsky et al. ........................... 370/60 |
| 4,922,486 | 5/1990 | Lidinsky . |
| 5,249,230 | 9/1993 | Mihm, Jr. ................................... 380/23 |
| 5,414,844 | 5/1995 | Wang ........................................ 395/650 |
| 5,469,576 | 11/1995 | Dauerer et al. ........................... 395/186 |
| 5,499,297 | 3/1996 | Boebert ..................................... 380/23 |
| 5,502,766 | 3/1996 | Boebert et al. ........................... 380/23 |
| 5,564,016 | 10/1996 | Korenshtein ............................. 395/186 |
| 5,657,388 | 8/1997 | Weiss ........................................ 380/23 |
| 5,671,354 | 9/1997 | Ito et al. ............................. 395/187.01 |
| 5,678,004 | 10/1997 | Thaweethai ........................ 595/187.01 |
| 5,684,951 | 11/1997 | Goldman et al. ................... 395/188.01 |
| 5,696,898 | 12/1997 | Baker et al. ........................ 395/187.01 |
| 5,721,780 | 2/1998 | Ensor et al. ............................... 380/25 |
| 5,774,525 | 6/1998 | Kanevsky et al. ......................... 379/88 |
| 5,774,551 | 6/1998 | Wu et al. .................................. 380/25 |
| 5,774,650 | 6/1998 | Chapman et al. ...................... 395/186 |
| 5,796,942 | 8/1998 | Esbensen ........................... 395/187.01 |

OTHER PUBLICATIONS

Claassen et al., "Secure communication procedure for ISDN", IEEE Trans. on computers, pp. 165–170, Jun. 1988.
Eric Benhanmou, "Integrating Bridges and Routers in a large internetwork", IEEE Network, pp. 65–71, Jan. 1988.
Weaver et al., "A real–time Monitor for token ring Networks", IEEE Trans. on computers, pp. 0794–0798, May 1989.

(List continued on next page.)

Primary Examiner—Robert W. Beausoliel, Jr.
Assistant Examiner—Nadeem Iqbal
Attorney, Agent, or Firm—Christie, Parker & Hale, LLP

[57] ABSTRACT

A user authentication service for a communication network authenticates local users before granting them access to personalized sets of network resources. Authentication agents on intelligent edge devices present users of associated end systems with log-in challenges. Information supplied by the users is forwarded to an authentication server for verification. If successfully verified, the authentication server returns to the agents authorized connectivity information and time restrictions for the particular authenticated users. The agents use the information to establish rules for filtering and forwarding network traffic originating from or destined for particular authenticated users during authorized time periods. An enhanced authentication server may be engaged if additional security is desired. The authorized connectivity information preferably includes identifiers of one or more virtual local area networks active in the network. Log-in attempts are recorded so that the identity and whereabouts of network users may be monitored from a network management station.

21 Claims, 8 Drawing Sheets

OTHER PUBLICATIONS

Ramesh Karri, "A Security Imbedded authentication protocol", IEEE Trans. on computers, pp. 1105–1109, Jun. 1988.

Cole et al., "An architecture for a mobile OSI mail access system", IEEE Journal on selected Areas in communications, vol. 7, No. 2, pp. 249–256, Feb. 1989.

Nakao et al., "Proposal on a secure communications service element in the OSI application Layer", IEEE Journal on selected areas on communications, vol. 7, No. 4, pp. 505–516, May 1989.

Ciminiera et al., "Authentication mechanism in microprocessor–based local area networks", IEEE Trans. on software Engineering, col. 15, No. 5, pp. 654–658, May 1989.

Lu et al., "Secure communication in internet environments: A hierarchical key management Scheme for end–to–end encryption", IEEE Trans. on communications, vol. 37, No. 10, pp. 1014–1023, Oct. 1989.

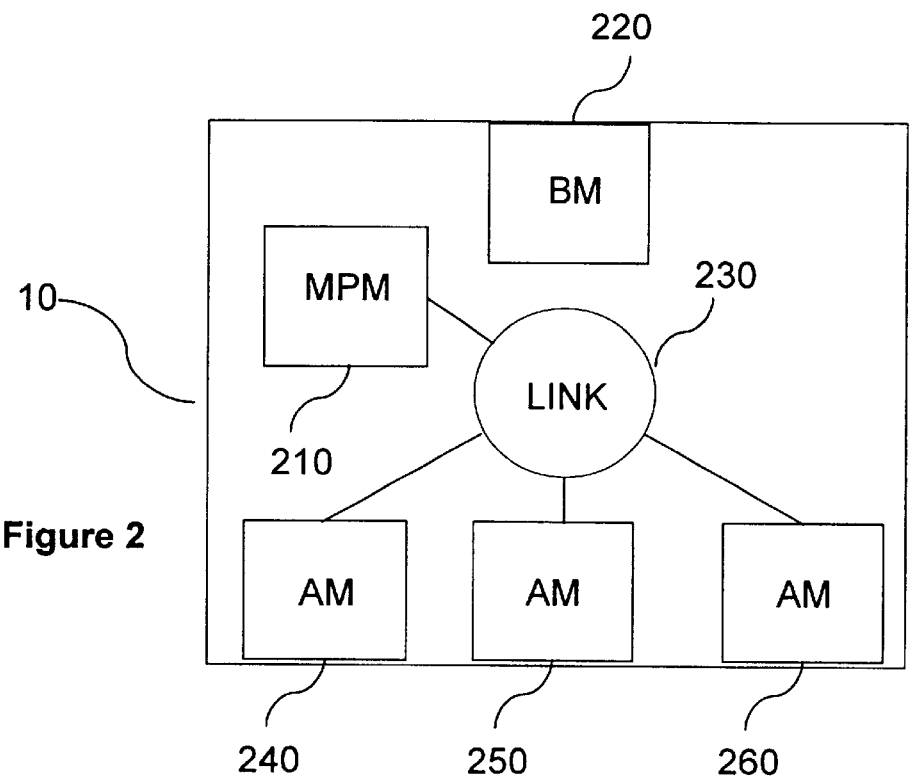
Figure 2
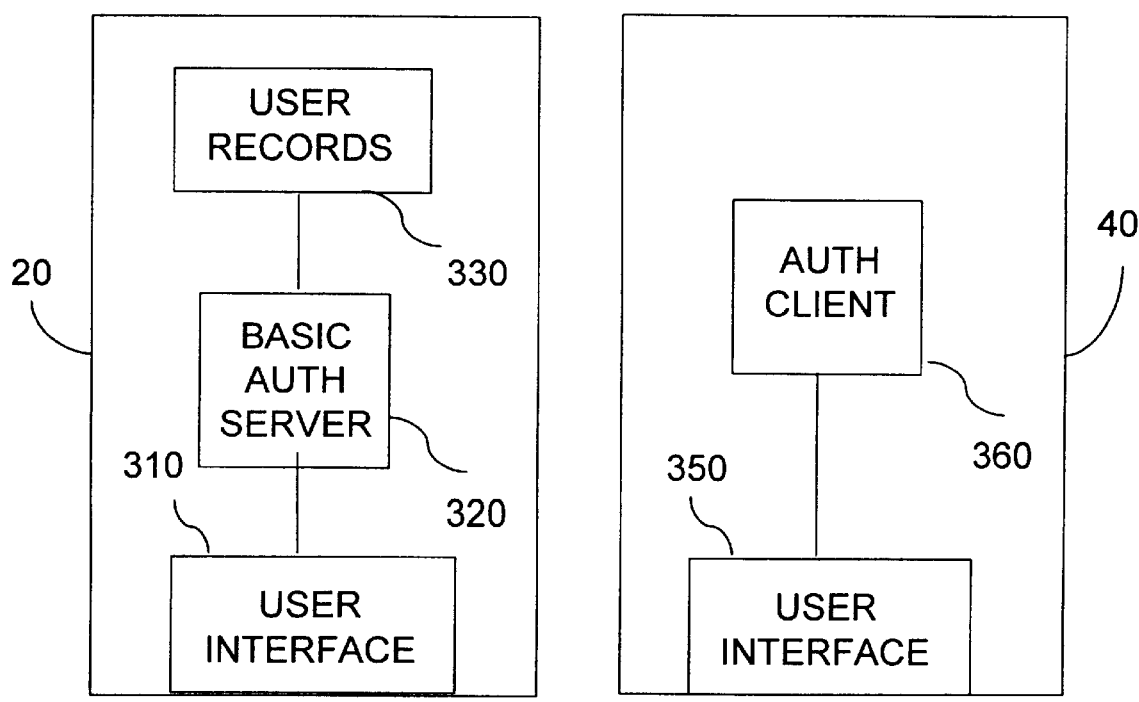
Figure 3A          Figure 3B

DETERMINISTIC USER AUTHENTICATION SERVICE FOR COMMUNICATION NETWORK

FIELD OF THE INVENTION

The present invention relates to regulating connectivity to and communicability within communication networks. More specifically, the present invention relates to authenticating and establishing personalized network communicability for local users of institutional communication networks.

BACKGROUND OF THE INVENTION

Institutions are relying increasingly on their data communication network infrastructures for efficient communication and data transfer. With this increasing reliance on network computing has arisen a significant need for mechanisms to regulate connectivity to and communicability within such networks. This need has been partially filled by internet protocol (IP) firewalls. IP firewalls typically restrict access to fixed sets of network resources by applying a set of protocol level filters on a packet-by-packet basis or by requiring prospective users to become authenticated before gaining access to the resources. Authentication has generally required users to supply certain signature information, such as a password. While this requirement of signature information has reduced the risk of unauthorized access to firewall-protected resources, firewalls have proven an imperfect and inflexible regulatory solution. Because firewalls are protocol-specific, firewalls have not provided a means for regulating network connectivity in a multi-protocol environment. Moreover, because firewalls regulate access to particular network resources, they have failed to provide a means for regulating access to sets of network resources which can vary as a function of user identity.

Protocol-independent mechanisms have also been deployed for authenticating users of the resources of institutional networks. However, such authentication mechanisms are only known to have been deployed to challenge remote users attempting to log-in over dial-up phone lines. Such mechanisms are not known to regulate the network access of local users logging-in over a LAN interfaces, such as Ethernet or Token Ring interfaces. Moreover, such mechanisms have, like firewalls, provided an inflexible solution which is unable to regulate access to customized or personalized sets of resources within the network based on user identity.

The flexibility limitations of the foregoing log-in challenge mechanisms have been partially overcome by independently implementing virtual local area networks (VLANs) within institutional networks. VLANs are sub-networks which typically include a plurality of network devices, such as servers, workstations and PCs, that together form a logical work group within a larger network. Because VLAN membership is assigned based on policies rather than physical location in the network, network bandwidth has been conserved and network security enhanced by assigning VLAN membership based on considerations of efficiency and need and restricting the flow of network traffic across VLAN boundaries.

While significant security and efficiency gains have been realized by policy-based VLANs, the solution they have offered is far from complete. VLAN membership has generally been assigned to end systems without reference to the identity of the users of such systems. In the current technology, for instance, VLAN membership is typically assigned by comparing network traffic with a configured set of rules which classify the traffic, and by inference the system which originated the traffic, into one or more VLANs. The identity of the user who sent the traffic is not considered in the assignment process. The failure to consider user identity leaves some network security issues unaddressed. Particularly, a person not authorized to use the resources of a VLAN may be able to gain access to its resources by transmitting data packets which the configured rules will classify into the VLAN, either by communicating over a member end system or by spoofing the required identifiers. Known VLAN assignment methods have also failed to contemplate providing conditional access to users based on the day of the week, the time of day, the length of access or a combination of such factors. Furthermore, current networking equipment and policy-based VLANs in particular have not offered collateral functionality, such as the ability to dynamically track where local users are connected to the network. Such a tracking mechanism would greatly simplify tasks such as network troubleshooting by allowing the network location of a user requesting technical support to be easily determined.

Accordingly, there is a need for comprehensive services for regulating communicability in institutional networks which are not subject to the inflexibility of conventional user log-in mechanisms or the lack of consideration for user identity of conventional VLAN assignment techniques. There is also a need for services which authenticate local users of institutional networks before establishing network communicability. There is a further need for user authentication services which provide collateral functionality, such as the ability to dynamically track the whereabouts of network users.

SUMMARY OF THE INVENTION

In accordance with its basic feature, the present invention combines the user-specific advantages of log-in challenges and the flexibility of VLANs into a deterministic user-based authentication and tracking service for local users of institutional communication networks.

It is therefore one object of the present invention to provide a service which authenticates local users before establishing network communicability.

It is another object of the present invention to provide a service which assigns and regulates user access to personalized sets of network resources.

It is another object of the present invention to provide a service which grants user access to personalized sets of network resources upon verifying signature information.

It is another object of the present invention to provide a service which conditions user access to personalized sets of network resources on one or more time-dependent variables.

It is another object of the present invention to provide a service which tracks user identity and network location.

These and other objects of the present invention are accomplished by a service which requires that local users be authenticated before gaining access to personalized sets of network resources. User identification information, time restrictions and authorized lists of resources for particular users are entered and stored in the network. Prior to authentication, packets from an end system being used by a prospective user of network resources are transmitted to an authentication agent operative on an intelligent edge device associated with the system. The agent relays log-in responses received from the system to a basic authentication server in the network for verification of the user. Verification is made by comparing log-in responses with the user identification information stored in the network and determining whether time restrictions associated with the user identification information are applicable. If the basic authentication server is able to verify from the log-in response that the user is an authorized user of network resources, and that the user is authorized to use the network resources at the time of the log-in attempt, the basic authentication server transmits to the agent the list of network resources for which the user is authorized, along with any time restrictions. The agent forwards the list of authorized network resources and time restrictions for storage and use on the edge device. The edge device uses the authorized list of resources and time restrictions to establish network communicability rules for the user. Preferably, the authorized list of network resources is a list of one or more VLANs.

If the basic authentication server is unable to verify from the log-in response that the user is an authorized user of network resources and authorized to use network resources at the time of the log-in attempt, the basic authentication server communicates that information to the agent. Packets from the user continue to be directed to the agent or, alternatively, are dropped. Preferably, the number of log-in attempts users are granted before packets are dropped is configurable.

In another aspect of the invention, the basic authentication server records information relating to the identity and network location of users learned from log-in attempts. The information is accessible by a network administrator tracking network activity from a network management station.

In another aspect of the invention, when the basic authentication server successfully verifies that the user is an authorized user of network resources, and that the user is authorized to use the network resources at the time of the log-in attempt, the basic authentication server, in lieu of transmitting to the agent the list of authorized network resources and time restrictions, initiates an enhanced authentication method for the user. The enhanced authentication method is preferably conducted by an enhanced authentication server within the network.

In another aspect of the invention, when an authenticated user logs-off the network, or fails to transmit packets for a predetermined time, or if the system being used by the authenticated user is disconnected from the network, or if the authorized communicability period expires, or if the basic authentication server or other management entity instructs the agent to abolish the authenticated user's network communicability, the authenticated user's network communicability is deactivated.

The present invention can be better understood by reference to the following detailed description, taken in conjunction with the accompanying drawings which are briefly described below. Of course, the actual scope of the invention is defined by the appended claims.

BRIEF DESCRIPTION OF THE DRAWINGS

FIG. 2 is a schematic of an intelligent edge device operative in the network according to FIG. 1;

FIG. 3A is a schematic of a network management station operative in the network according to FIG. 1;

FIG. 3B is a schematic of a end system operative in the network according to FIG. 1;

DETAILED DESCRIPTION OF THE PREFERRED EMBODIMENT

Figure 1:
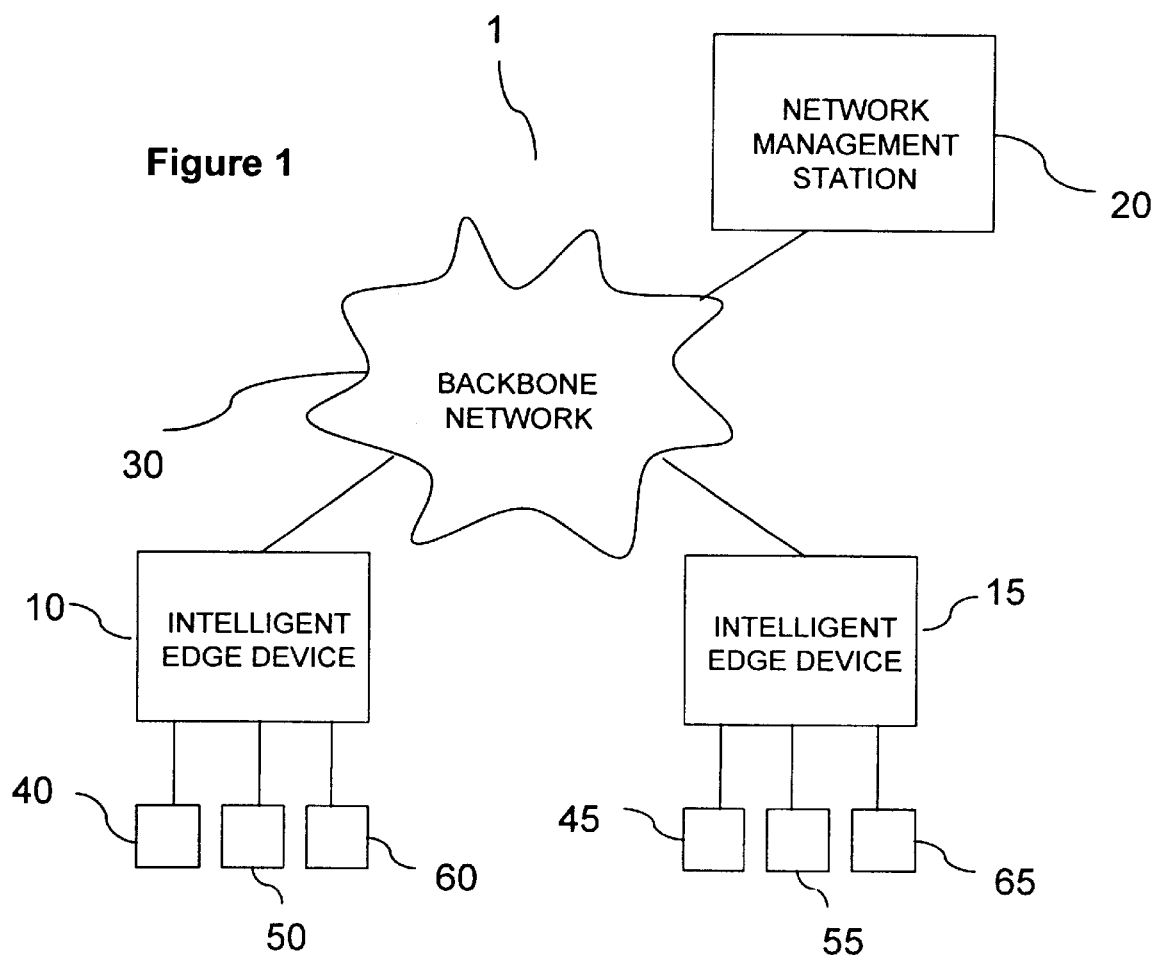
FIG. 1 is a schematic of a network in which a preferred embodiment of the present invention is operative.

Referring to FIG. 1, a network 1 operating in accordance with a preferred embodiment of the present invention is shown. Network 1 includes intelligent edge devices 10, 15 and a network management station 20 interconnected over a backbone network 30, such as an asynchronous transfer mode (ATM) or fiber distributed data interface (FDDI) network. Devices 10, 15 and station 20 are interconnected using cables, which may be fiber optic, unshielded twisted pair, or other form. Devices 10, 15 are associated with end systems 40, 50, 60, and 45, 55, 65, respectively, which are operative in local area network (LAN) communication media, such as Ethernet or Token Ring. It will be appreciated that Ethernet as used herein is not limited to 10 megabit Ethernet, but includes other Ethernet varieties, such as Fast Ethernet and Gigabit Ethernet. Systems 40, 50, 60 and 45, 55, 65 may be workstations, PCs, or other systems having a user interface. Although the illustrated network 1 is shown to include two edge devices each associated with multiple end systems, it will be appreciated that a network operating in accordance with the present invention may include one or more edge devices interconnected across a backbone network, and that each edge device may be associated with one or more end systems or servers. It will also be appreciated that, in networks operating in accordance with the present invention, every edge device preferably has common operational capabilities.

Turning to FIG. 2, device 10 is shown in greater detail. Device 10 is preferably representative of devices 10, 15. Device 10 includes a management processor module 210, backbone module 220 and authentication modules 240, 250, 260 interconnected over a switching link 230. Modules 220, 240, 250, 260 are preferably implemented using custom logic, e.g., application specific integrated circuits (ASICs), while management processor module 210 is preferably software-implemented. Authentication modules 240, 250, 260 each include a LAN interface interconnecting systems 40, 50, 60, respectively, and switching link 230. In contradistinction to hubs which indiscriminately forward packets in unmodified form to all associated end systems, device 10 includes means on each of modules 220, 240, 250, 260 for interpreting, modifying, filtering and forwarding packets. Preferably, modules 220, 240, 250, 260 are also operative to perform necessary LAN media translations so that device 10 is able to support end stations operating using disparate LAN media. Thus, for example, system 40 utilizing an Ethernet communication protocol may communicate through device 10 with system 50 utilizing Token Ring. LAN switches marketed by the assignee hereof under the federally registered trademarks OmniSwitch® and PizzaSwitch®, implemented with appropriate switching modules available from the assignee, may advantageously be implemented as devices 10, 15 in the performance of the above-described functionality.

Turning to FIG. 3A, a schematic diagram of network management station 20 is shown. Preferably, station 20 includes a user interface 310, a software-implemented basic authentication server 320 and user records 330. Although server 320 and user records 330 are shown operative on station 20, server 320 and user records 330, or either one, may be operative on another device in network 1 accessible by station 20. Although network 1 is illustrated to include a single basic authentication server 320, a network operating in accordance with the present invention may include one or more basic authentication servers. Server 320 is preferably configured with an address of each of devices 10, 15 and an associated authentication key for the authentication agent active on each of devices 10, 15. The addresses are preferably IP addresses.

Turning to FIG. 3B, a schematic diagram of system 40 is shown. System 40 is representative of systems 40, 50, 60 and 45, 55, 65. System 40 has a user interface 350 and an authentication client 360. Authentication client 360 is software used during the authentication process. This is preferably a software application installed on system 40 but may also take the form of a standard software application such as Telnet. Client 360 is configured with an address of an authentication agent on associated device 10, which may be an IP address or a reserved media access control (MAC) address.

Figure 4:
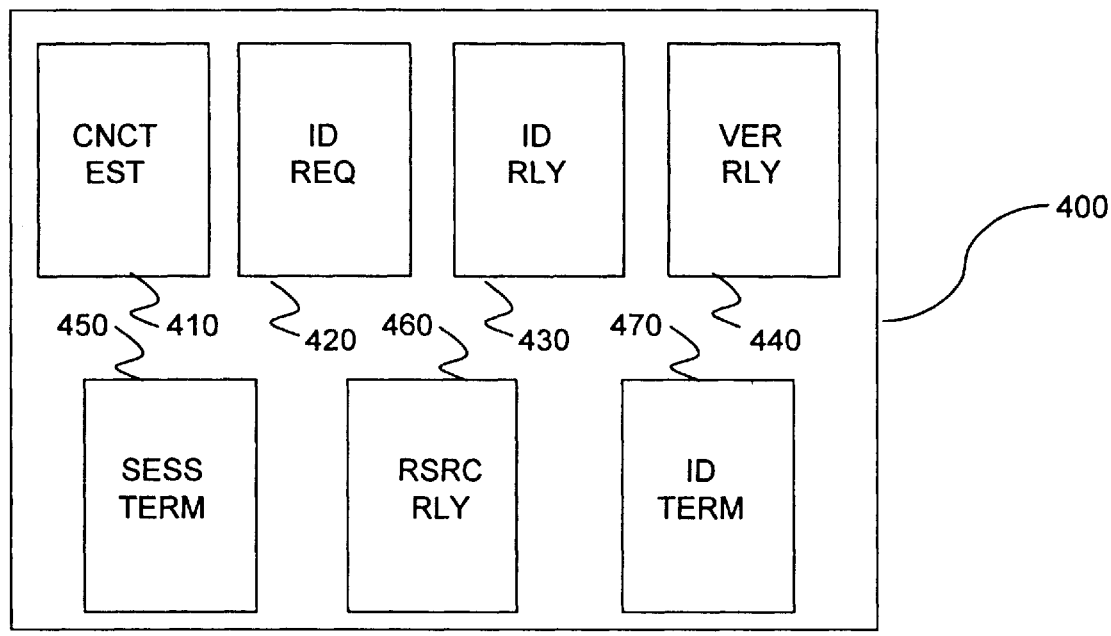
FIG. 4 is a functional diagram of an authentication agent operative in the network according to FIG. 1.

An authentication agent is deployed on each of devices 10, 15. Turning to FIG. 4, a functional diagram of an authentication agent 400 residing on device 10 is shown. Agent 400 is preferably a software module implemented by management processor module 210. Agent 400 is configured with an address of device 10, an address of basic server 320 and an authentication key for server 320. The configured addresses are preferably IP addresses.

Agent 400 includes CNCT EST means 410. Means 410 serves, upon initialization of device 10, to establish a secure connection with server 320. Means 410 requests a connection to server 320 using the known address of server 320 and acknowledges a response from server 320 to such a request. Means 410 also transmits and receives information from and to server 320 sufficient to allow agent 400 and server 320 to authenticate one another. Preferably, mutual authentication is accomplished through exchange of authentication keys configured on agent 400 and server 320. Means 410 may encrypt information and decipher encrypted information transmitted during the secure connection establishment process. TCP/IP based flows between agent 400 and server 320 are contemplated. Although network 1 is shown to include only one basic server 320, it will be appreciated that a network may include more than one basic server. If an agent is configured with the address of more than one basic server in the network, and an attempt to establish a secure connection with a particular server fails, the agent may implement the foregoing process using the known address of another basic server until a secure connection is established.

Agent 400 also includes ID REQ means 420. Means 420 serves to obtain log-in responses from users of associated systems 40, 50, 60 by communicating with authentication clients operative on systems 40, 50, 60. Means 420 acknowledges requests received from clients to establish an authentication session. Means 420 responds to the requests by transmitting a log-in prompt to the requesting one of clients. IP-based flows using an application, such as Telnet, or MAC-based flows between agent 400 and clients are contemplated. Flows are initiated by clients using a reserved MAC address or IP address of agent 400 configured on clients.

Agent 400 also includes ID RLY means 430. Means 430 serves to relay to server 320 for verification log-in responses received from users in response to log-in prompts. Means 430 associates the known address of device 10, the identifier of the authentication module (i.e., 240, 250 or 260) associated with the one of systems 40, 50, 60 being used by a user and the log-in response. Means 430 transmits the associated authentication information to server 320 for verification.

Agent 400 also includes VER RLY means 440. Means 440 serves to relay user status information received from server 320 to users. Means 440 transmits user status information to the one of systems 40, 50, 60 being used by a user. User status information preferably includes a log-in valid or log-in invalid message, depending on whether server 320 was able to successfully verify the log-in response. IP-based flows using an application such as Telnet or MAC-based flows are contemplated for transmission of user status information between agent 400 and clients.

Agent 400 also includes SESS TERM means 450. Means 450 serves to terminate an authentication session if a user has failed to be authenticated after a configurable number of failed log-in attempts. Means 450 transmits to the client associated with the one of systems 40, 50, 60 being used by the user an authentication session termination message after a configurable number of log-in failures. Means 450 also terminates the authentication session with the one of clients.

Agent 400 also includes RSRC RLY means 460. Means 460 serves to forward for storage and use on device 10 authorized communicability information received from server 320 for authenticated users of systems 40, 50, 60. Authorized communicability information may advantageously be transmitted by server 320 to agent 400 in the same data packet as user status information. Authorized communicability information includes, for the particular one of the systems 40, 50, 60, a list of authorized network resources. Authorized communicability information may also include time restrictions, if any. Time restrictions preferably define times during which the particular user is authorized to use the network resources, such as the day of the week, the time of day, and the length of permitted access. The list of authorized network resources is preferably a list of VLAN identifiers. Authorized communicability information is preferably forwarded by agent 400 to management processor module 210 along with the authentication module identifier. Management processor module 210 preferably associates the authorized connectivity information with a known address of the one of the systems 40, 50, 60 being used by the authenticated user and stores the pair in device records. The address is preferably a MAC address.

Device records are advantageously used on device 10 to make filtering and forwarding decisions on packets received from and destined for authenticated users. Packets transmitted by an unauthenticated one of systems 40, 50, 60, unless addressed to authentication agent 400, are dropped by the receiving one of modules 240, 250, 260. Packets addressed to an unauthenticated one of systems 40, 50, 60 are also dropped. Packets transmitted by one of authenticated systems 40, 50, 60 addressed to another authenticated one of systems 40, 50, 60 are selectively forwarded according to the following rules:

1. If the destination address is the address of another one of systems 40, 50, 60 associated with device 10, resort is made to device records on device 10 to verify that the source and destination systems share a common VLAN. If a VLAN is shared, the packet is forwarded to the destination system. If a VLAN is not shared, the packet is dropped.

2. If the destination address is not the address of another one of systems 40, 50, 60 associated with device 10, resort is made to device records on device 10 to retrieve the VLAN identifiers associated with the source system. The VLAN identifiers are appended to the packet and the packet is forwarded to backbone module 220 for transmission on backbone network 30. When the packet arrives on the edge device (e.g., 15) associated with the destination system (e.g., 45), resort is made to device records on the edge device to verify that the source and destination systems share a common VLAN. If a VLAN is shared, the packet is forwarded to the destination system. If a VLAN is not shared, the packet is dropped.

Packets addressed to unauthenticated systems in network 1 continue to be dropped. The foregoing rules may be implemented using various known protocols. See, e.g., Ross U.S. Pat. No. 5,394,402 and Nair & Bailey, application Ser. No. 08/782,444, which are incorporated herein by reference. It will be appreciated that any addressable core, edge, or end devices, stations and systems in network 1 which are not subject to authentication requirements may be treated as authenticated systems for purposes of transmitting and receiving packets under the foregoing rules.

Agent 400 also includes ID TERM means 470. Means 470 serves, upon receipt of log-off commands from authenticated users, or upon expiration of the authorized communicability period, or when one of authenticated systems 40, 50, 60 is physically disconnected from network 1, or when one of authenticated systems 40, 50, 60 fails to send traffic for a prescribed length of time, or upon receipt of instruction from server 320, to deactivate the established network communicability. Means 460 forwards to management processor module 210 a request to remove from device records the address-authorized communicability information entry for the user whose communicability is to be deactivated. Upon receipt of such a request, management processor module 210 preferably removes the entry from device records and the authenticated one of systems 40, 50, 60 reverts to the unauthenticated state.

Figure 5:
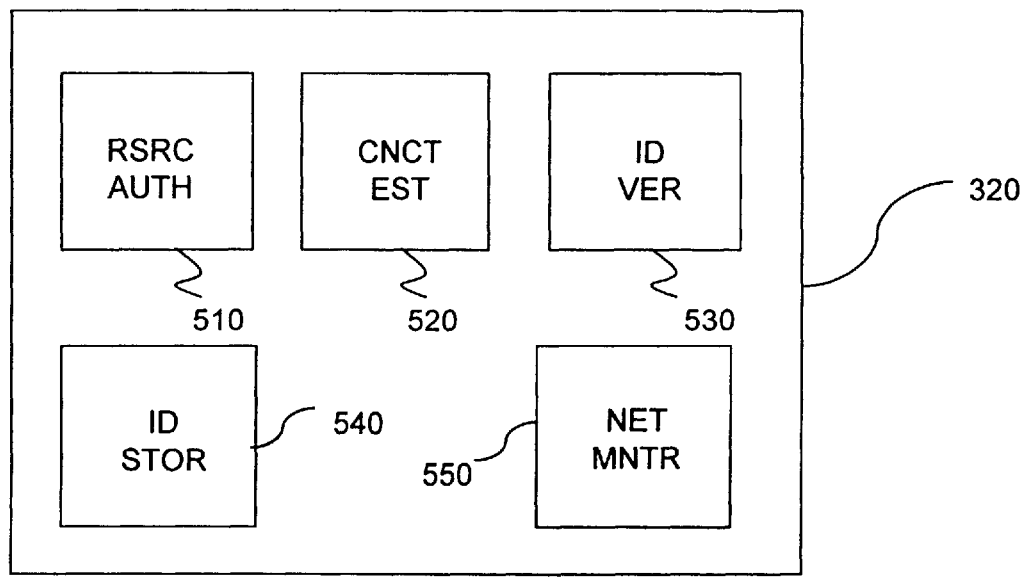
FIG. 5 is a functional diagram of a basic authentication server operative in the network according to FIG. 1.

Turning to FIG. 5, a functional diagram of basic authentication server 320 is shown. Server 320 includes RSRC AUTH means 510. Means 510 serves to enable network administrators to define, on an individualized basis, authorized communicability information for users of the network 1. Means 510 enables a network administrator to input user-specific entries. Means 510 supplies a textual or graphical display to user interface 310 operative to accept user-specific entries. Means 510 stores each user-specific entry as a related pair in user records 330. Each user-specific entry preferably includes user identifier information and a list of authorized network resources. User-specific entries may also include time restrictions for the particular user. User identification information preferably includes signature information for the user, such as a password. Means 510 also enables a network administrator to input device-specific entries. Device-specific entries preferably includes, for each edge device in network 1 having an authentication agent, a device address and an authentication key. Device addresses are preferably IP addresses. Means 510 stores each device-specific entry as a related pair in network management records (not shown). Each device address is preferably uniquely assigned to a particular edge device operative within network 1.

Server 320 also includes CNCT EST means 520. Means 520 serves, upon receipt of a request from an authentication agent, to establish a secure connection with the agent. Means 520 acknowledges receipt from the agent of a request to establish a secure connections and to respond to the request. Means 520 also transmits and receives information sufficient to allow the agent and server 320 to authenticate one another. Preferably, authentication is established through exchange of authentication keys. Means 520 may encrypt information and decipher encrypted information transmitted during the secure connection establishment process. TCP/IP based flows between the agent and server 320 are contemplated.

Server 320 also includes ID VER means 530. Means 530 serves to subject to a verification process authentication information received from users via agent 400. Means 530, upon receipt of authentication information from agent 400, determines if the log-in response matches the user identification information associated with a user-specific entry in user records 330. If a match is found, and there are time restrictions associated with the user-specific entry, means 530 determines from the time restrictions if the user is authorized to use network 1 at the particular time. If the user is time-authorized or there are no time restrictions, means 530 generates authorized communicability information. Means 530 retrieves the list of authorized network resources associated with the matching user identification information in the generation of authorized communicability information. Authorized communicability information may also include any time restrictions. Means 530 also generates user status information. User status information is information sufficient to communicate to agent 400 whether user identification information was successfully verified. User status information is preferably either a log-in valid or log-in invalid message. Means 530 transmits authorized communicability information and user status information to agent 400. Preferably, authorized communicability information and user status information are transmitted as part of the same data packet. If no match for user identification information is found, or if the user is not time-authorized, means 530 generates and transmits to agent 400 user status information, preferably in the form of a log-in invalid message, but does not generate or transmit authorized communicability information. Although the above described means operative on server 320 are described to be interoperative in conjunction with agent 400, it will be appreciated that the means are fully interoperative with other authentication agents residing on edge devices in network 1.

Server 320 also includes ID STOR means 540. Means 540 serves to forward for storage and use by a network administrator user tracking information. User tracking information is preferably retained for all log-in attempts made by prospective users, whether successful or unsuccessful. User tracking information may include, for each login attempt, any information learned from one or more of the following: user identification information, authentication information, user status information, authorized communicability information. User tracking information also may include the time of day the log-in attempt was made. The time of day may be kept on and obtained from server 320. Server 320 preferably associates the user tracking information and stores the information as an entry in a network activity database (not shown) that is accessible by or resides on station 20. Network activity database entries are accessible by a network administrator using interface 310.

Server 320 also includes NET MNTR means 550. Means 550 serves to enable a network administrator to access and use user tracking information. Means 550 supplies a textual or graphical display to interface 310 operative to display user tracking information. Means 550 also enables a network administrator to generate user tracking information reports consisting of related information from one or more user tracking information entries.

Figure 6:
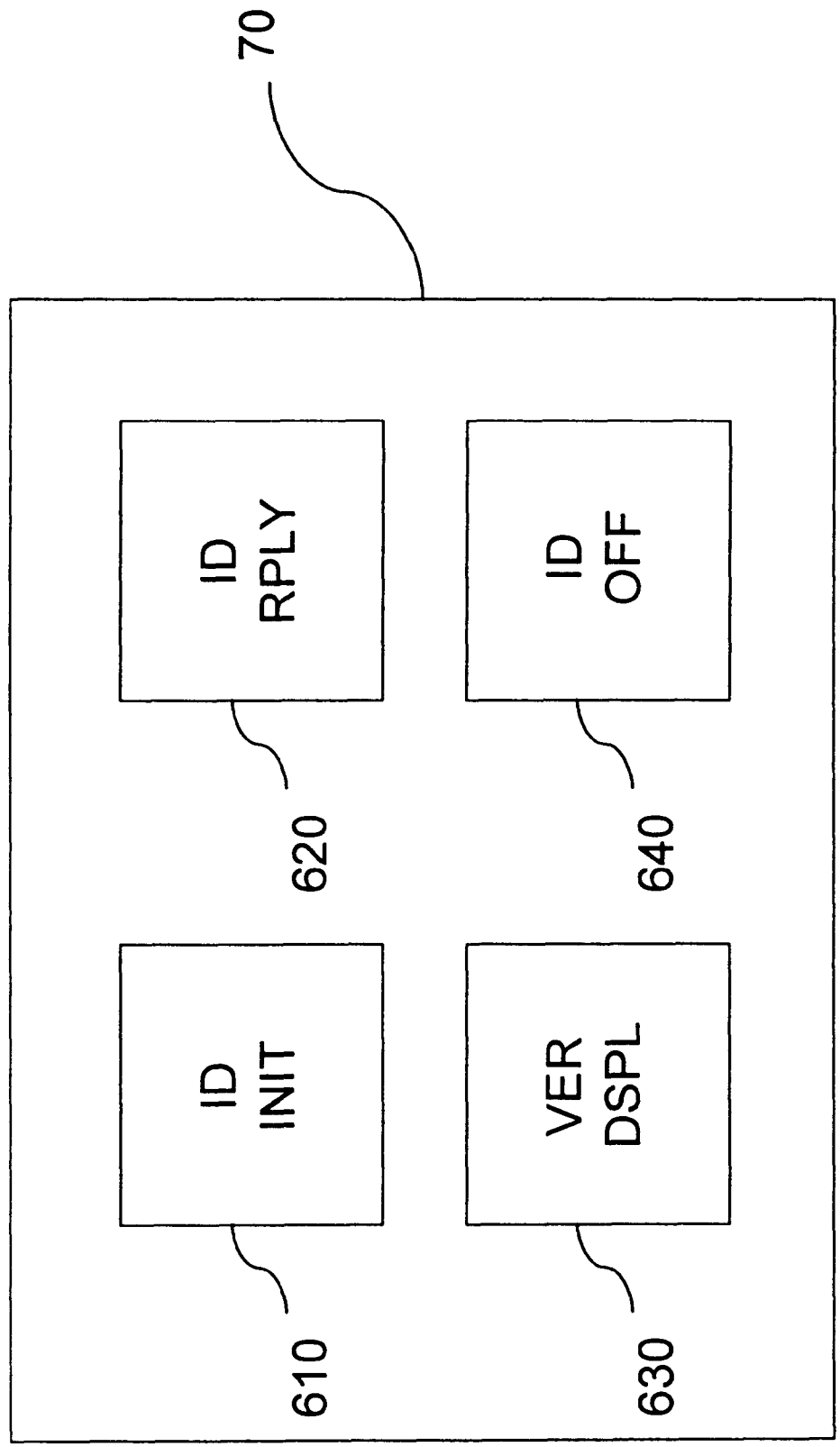
FIG. 6 is a functional diagram of an authentication client operative in the network according to FIG. 1.

Turning to FIG. 6, a functional diagram of client 360 is shown. Client 360 is representative of clients residing on systems 40, 50, 60 and 45, 55, 65. Client 360 includes ID INIT means 610. Means 610 serves, when system 40 is booted-up by a user, to request and establish an authentication session with agent 400. Alternatively, means 610 can be activated by a direct action of the user of system 40. Means 610 transmits to agent 400 a request to establish an authentication session using a known address of agent 400. Client 360 preferably transmits requests periodically until agent 400 responds. A MAC-based flow is contemplated. Alternatively, an IP-based flow using an application such as Telnet may be used.

Client 360 also includes ID RPLY means 620. Means 620 serves to enable users to reply to log-in prompts received from agent 400. Means 620 supplies a textual or graphical display to a user interface of system 40 operative to accept log-in responses. Means 620 also transmits log-in responses to agent 400.

Client 360 also includes VER DSPL means 630. Means 630 serves to convey to users whether log-in attempts were successful or unsuccessful. Means 630 supplies a textual or graphical display to a user interface of system 40 operative to display user status information, preferably a log-in valid message or a log-in invalid message, received from agent 400.

Client 360 further includes ID OFF means 640. Means 640 serves to initiate the log-off process by which authenticated users log-off the network 1. Means 640 supplies a textual or graphical display to user interface 350 operative to accept log-off commands. Means 640 transmits log-off commands to agent 400 for deactivation of established network communicability.

Figure 7:
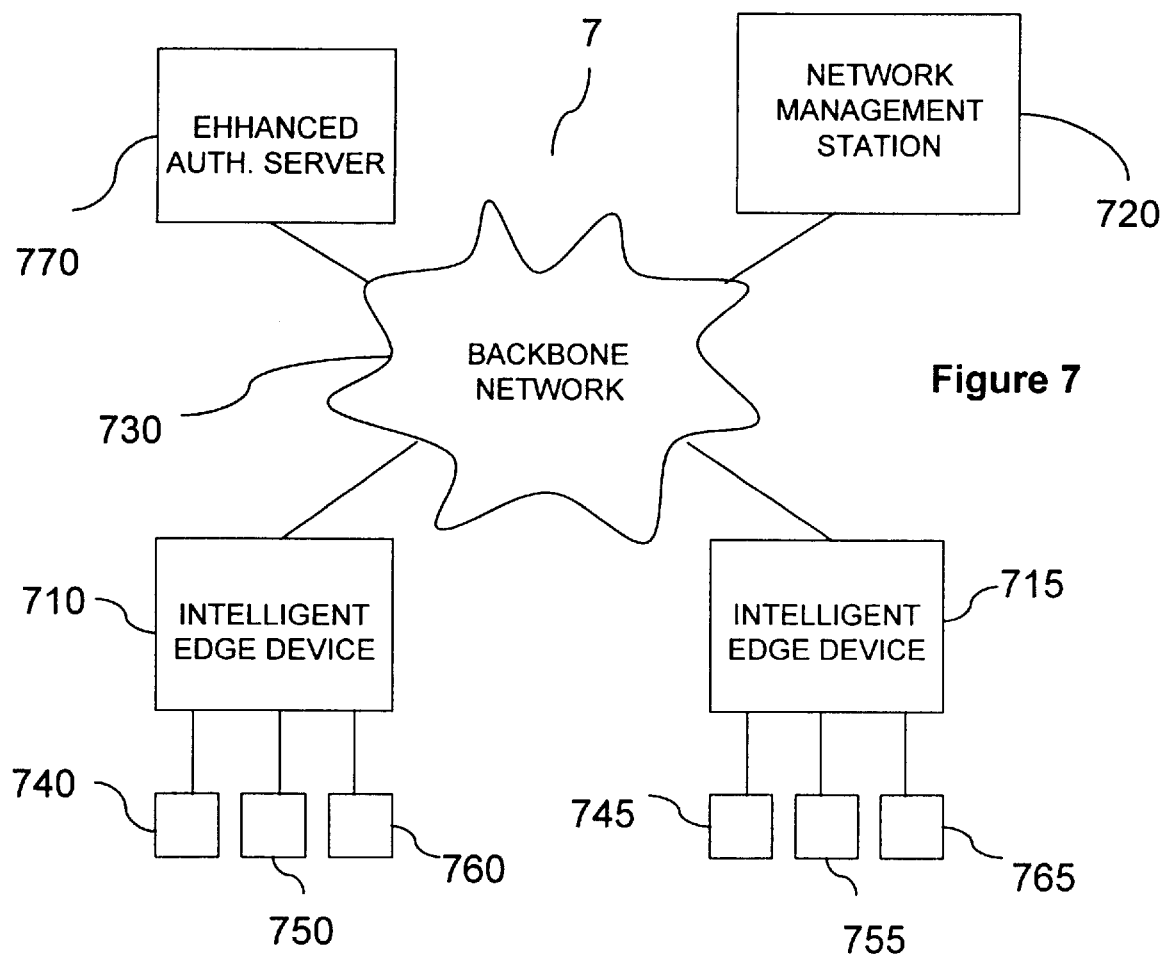
FIG. 7 is a schematic of an LAN in which a more preferred embodiment of the present invention is operative.

Referring to FIG. 7, a network 7 operating in accordance with an alternative embodiment of the present invention is shown. In the alternative embodiment, an enhanced authentication method is conducted before network communicability is granted. Network 7 includes intelligent edge devices 710, 715 and a network management station 720 interconnected over a backbone network 730 by means similar to those described in relation to network 1. Bridges 710, 715 are associated with end systems 740, 750, 760 and 745, 755, 765, respectively, which utilize LAN communication media, such as Ethernet or Token Ring. Network 7 also includes enhanced authentication server 770 interconnected over backbone network 730. It will be appreciated that, as in the previous preferred embodiment, a network operating in accordance with the alternative embodiment may include one or more edge devices having common operational capabilities and associated with one or more end sytems. In network 7, devices 710, 715 station 720 and systems 740, 750, 760 and 745, 755, 765 have operational capabilities common to their counterparts in network 1, plus additional operational capabilities hereafter described.

Figure 8:
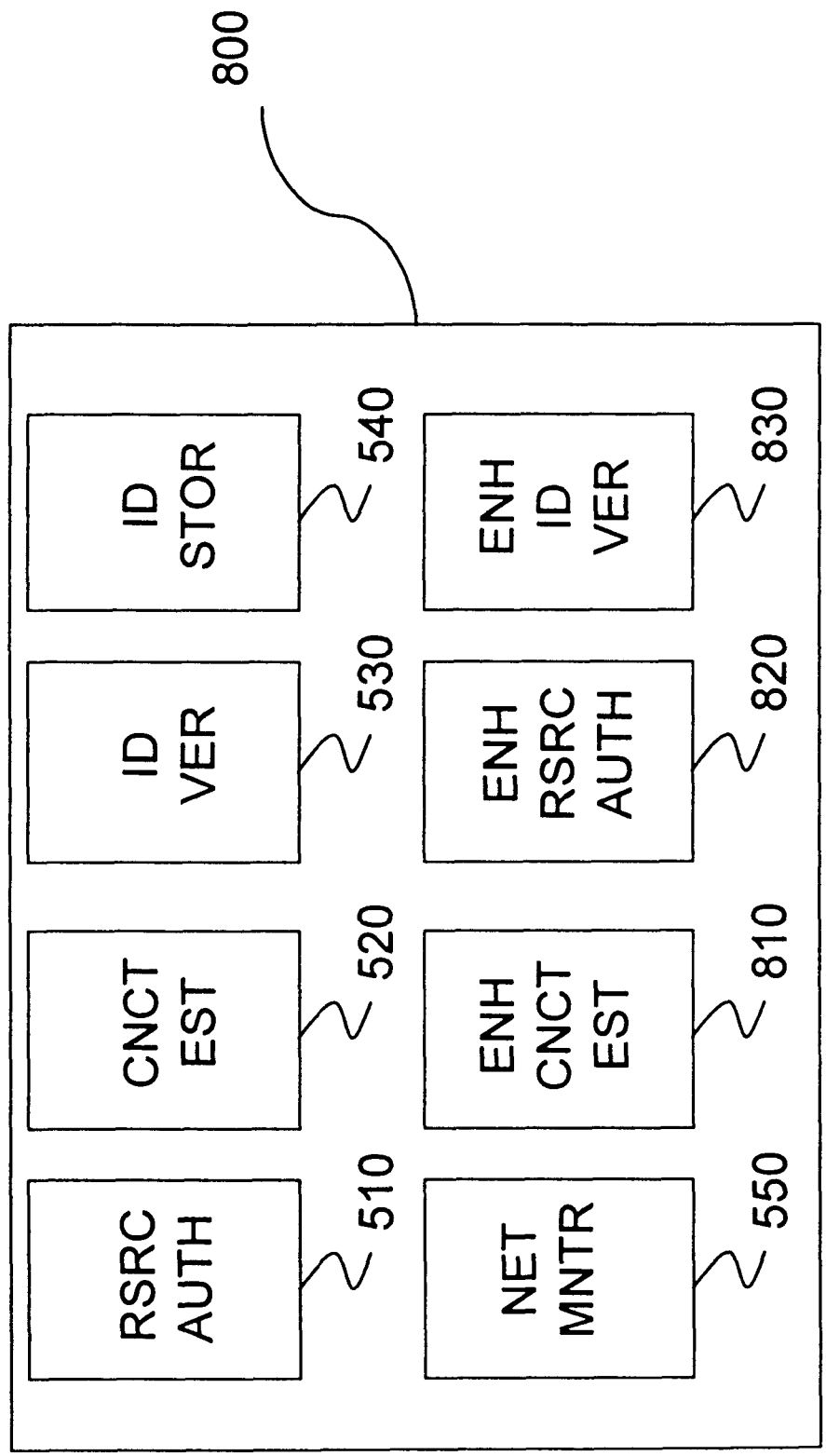
FIG. 8 is a functional diagram of a basic authentication server operative in the network according to FIG. 7.

Turning to FIG. 8, a functional diagram of a basic authentication server 800 preferably operable on station 720 is shown. Server 800 is preferably interoperative with devices 710, 715 and systems 740, 750, 760 and 745, 755, 765 and associated modules, agents and clients to perform the functionality of server 320 described above, including RSRC AUTH means 510, CNCT EST means 520, ID VER means 530, ID STOR means 540 and NET MNTR means 550.

Server 800 also includes ENH CNCT EST means 810. Means 810 serves to establish and maintain a secure connection with enhanced authentication server 770. A TCP/IP based flow is contemplated. Server 800 also includes ENH RSRC AUTH means 820. Means 820 serves to enable network administrators to define, on an individualized basis, an enhanced authentication method for each prospective user of network 7. Means 820 enables a network administrator to enter user-specific entries which additionally include enhanced authentication method information. Enhanced authentication method information includes information sufficient to enable basic server 800 to identify a device, station, or system within network 7 which will conduct the enhanced authentication session, if any, the prospective user must successfully complete to become authenticated. Preferably, enhanced authentication method information includes an IP address of enhanced authentication server 770. Enhanced authentication methods may include one of various security methods implemented on enhanced authentication server 770. Authentication methods marketed under the trade names Secure ID™ by Security Dynamics, Inc. and methods that comply with Internet Engineering Task Force (IETF) RFC 2058 Remote Authentication Dial-in User Service (RADIUS) are referenced herein by way of example.

Server 800 also includes ENH ID VER means 830. Means 830 serves, upon verifying log-in responses received from a user and that the user is authorized to use the network 7 at the time of the log-in attempt, to initiate an enhanced authentication method, if indicated. Means 830, upon determining that the log-in response matches user identification information associated with a user-specific entry in user records, and upon determining that the user is time-authorized if time restrictions are indicated, checks whether there is an enhanced authentication method associated with the matching user-specific entry. If an enhanced authentication method is indicated, means 820, before transmitting authorized connectivity information and user status information to the agent on the appropriate one of devices 710, 715, transmits a request to enhanced authentication server 770 to conduct an enhanced authentication session with the user. The enhanced authentication session is preferably conducted between enhanced server 770 and the user transparently to basic server 800. Enhanced server 770 instructs basic server 800 of the results of the enhanced authentication session. If the user was successfully authenticated, means 830 transmits to the agent authorized communicability information and user status information, preferably in the form of a log-in valid message. If the user was not successfully authenticated, means 830 transmits user status information, preferably a log-in invalid message, but no authorized communicability information. If an enhanced authentication method is not indicated when the check for an enhanced authentication method is performed, means 830 transmits to the agent authorized communicability information and user status information, in the form of a log-in valid message, without engaging server 770. If a matching entry for user identification information is not found in user records, or if the user is not time-authorized, means 830 transmits to the agent user status information, in the form of a log-in invalid message, without transmitting authorized communicability information.

Figure 9:
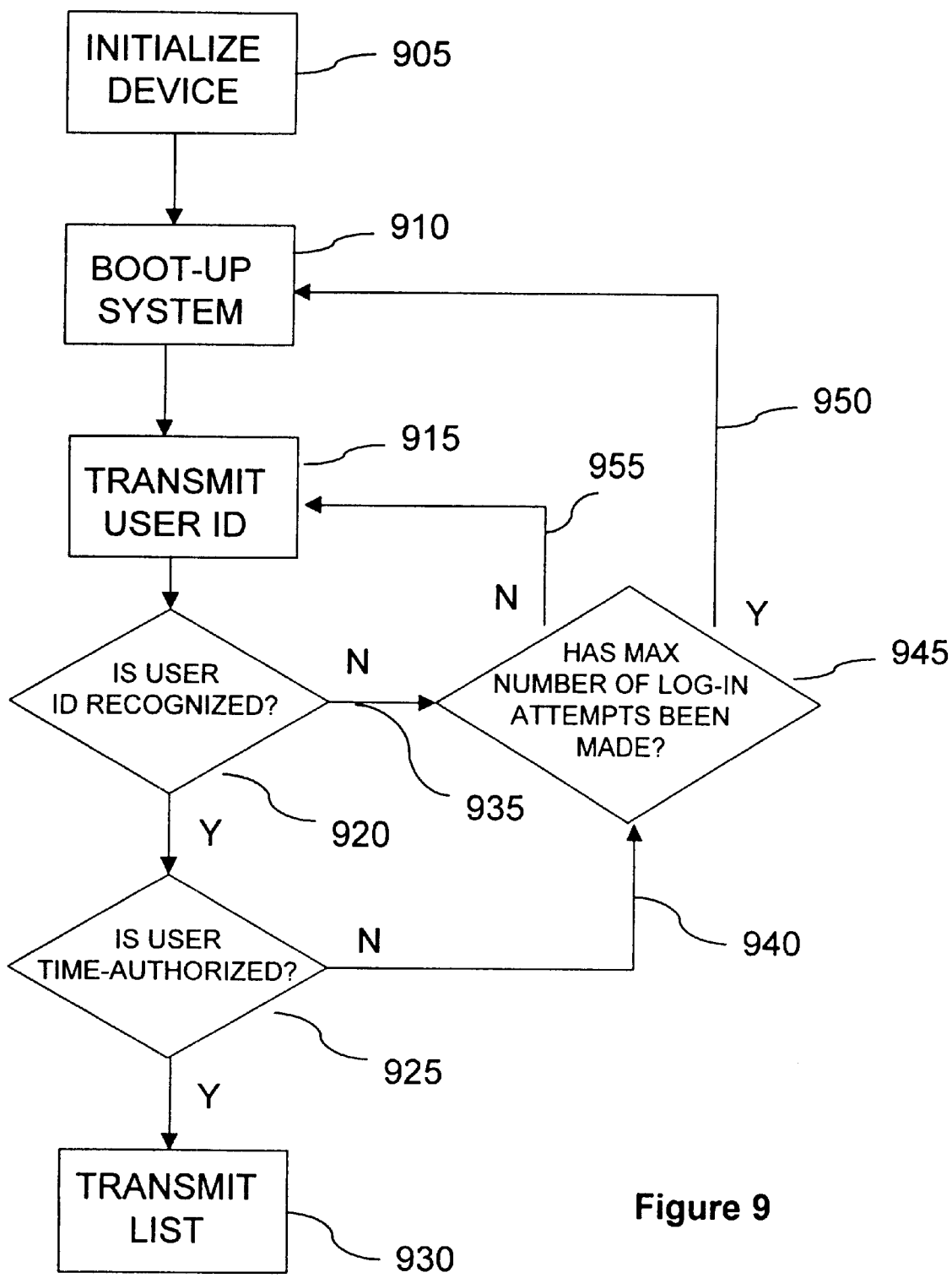
FIG. 9 is a flow diagram of a preferred method for authenticating users within network 1.

Referring now to FIG. 9, a flow diagram illustrates a preferred method for implementing the invention within network 1. When device 10 is initialized (905), agent 400 attempts to establish a secure connection with server 320 using the known address of server 320. Once a TCP session is successfully established, agent 400 and server 320 authenticate one another by exchanging authentication keys.

When a user boots-up device 40 (910), client 360 activates. Client 360 sends an authentication request to agent 400 using a known address of agent 400. Authentication requests are transmitted to agent 400 periodically until agent 400 responds. When agent 400 receives a request, agent 400 responds by transmitting a log-in prompt to client 360.

The user enters a log-in response and the response is transmitted to agent 400 (915). Agent 400 transmits authentication information to server 320. Authentication information preferably includes an address of device 10, an identifier of authentication module 240 associated with system 40, and the log-in response.

Server 320 determines whether the log-in response is recognized on station 20 (920). Server 320 checks user records 330 for a user-specific entry having user identification information matching the log-in response. If a matching entry is found, server 320 checks any time restrictions associated with the entry to determine if the user is authorized to use the network resources at the particular time (925). If the prospective user is time-authorized, server 320 retrieves the list of authorized network resources and any time restrictions associated with the matching user identification information. The information is transmitted to agent 400 (930) along with user status information, preferably a log-in valid message. If no matching entry is found (935), or if the user is not time-authorized (940), user status information, preferably a log-in invalid message, is returned to the user via agent 400. Agent 400 also in that instance determines if user has made the configurable number of failed log-in attempts (945). If the configurable number of failed log-in attempts has been reached (950), agent 400 terminates the authentication session with client 360. The user is denied network access until such time as the user reboots system 40. If the configurable number of failed log-in attempts has not been reached (955), agent 400 presents the user with another log-in prompt.

Figure 10:
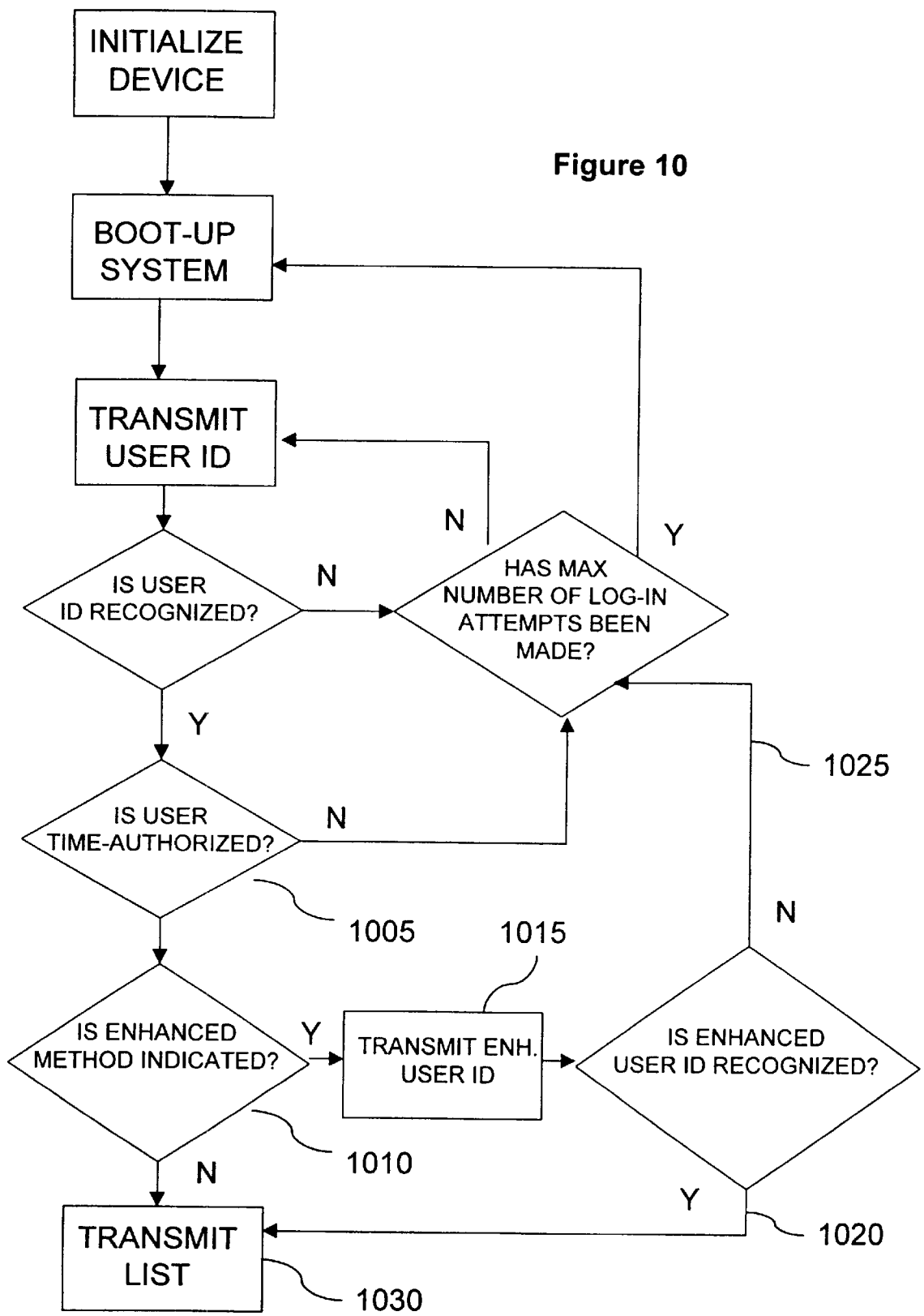
FIG. 10 is a flow diagram of a preferred method for authenticating users within network 7.

Turning to FIG. 10, a flow diagram illustrates a preferred method for implementing the invention within network 7. The method proceeds generally as in FIG. 9, except that an enhanced authentication method is performed, if indicated. Accordingly, once a determination is made that the user is time-authorized (1005), basic server 800 checks whether there is an enhanced authentication method associated with the matching entry (1010). If an enhanced authentication method is indicated, server 800 transmits a request to enhanced authentication server 770 to conduct an enhanced authentication session with the user (1015). Enhanced server 770 informs basic server 800 of the results of the enhanced authentication session. If the session was successfully completed (1020), basic server 800 transmits authorized communicability information and user status information, in the form of a log-in valid message, to the agent (1030). If enhanced session was not successfully completed (1025), basic server 800 transmits a log-in invalid message to user and does not transmit authorized communicability information to agent. Agent also in that instance determines if user has made a configurable number of failed log-in attempts. The authentication session either continues or terminates as discussed depending on the outcome of that inquiry. If an enhanced authentication method is not indicated when the check for an enhanced authentication method is performed (1010), server 800 transmits authorized communicability information and user status information, in the form of a log-in valid message, without requesting server 770 to conduct an enhanced authentication session.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

We claim:

1. A user authentication service for a communication network including a plurality of nodes each having a different network interface, comprising:

means for accepting and storing, as entries for particular users, user identification information;

means for accepting a log-in response entered on an end system, the system having a LAN interface;

means for comparing for a match the log-in response with the user identification information; and means for establishing, if a match is found, communicability between the system and a selectable group of the nodes.

2. The user authentication service according to claim 1, wherein said LAN interface is operative for communicating with said system in a LAN media type.

3. The user authentication service according to claim 2, wherein said LAN media type is Ethernet or Token Ring.

4. A user authentication service for a communication network including a plurality of nodes each having a different network interface, comprising:

means for accepting and storing, as associated entries for particular users, user identification information and groups of the nodes;

means for accepting a log-in response entered on an end system in the network;

means for comparing for a match the log-in response with the user identification information; and means for establishing communicability between the system and each member of a group of the nodes associated with matching user identification information.

5. The user authentication service according to claim 4, wherein the groups of nodes are represented in the entries by virtual local area network identifiers.

6. A user authentication service for a communication network including a plurality of nodes each having a different network interface, comprising:

means for accepting and storing, as associated entries for particular users, user identification information, time restrictions defining an access period and groups of the nodes;

means for accepting a log-in response entered on an end system in the network;

means for comparing for a match the log-in response with the user identification information;

means for establishing communicability between the system and each member of a group of the nodes associated with matching user identification information, for the defined access period associated with the matching user identification information.

7. The user authentication service according to claim 6, wherein the groups of nodes are represented in the entries by virtual local area network identifiers.

8. A user authentication service for a communication network including a plurality of nodes each having a different network interface, comprising:

means for accepting and storing, as associated entries for particular users, user identification information, groups of the nodes, and enhanced authentication information, the enhanced authentication information identifying an enhanced authentication server operative in the network;

means for accepting a log-in response entered on an end system in the network;

means for comparing for a match the log-in response with the user identification information;

means for conducting an enhanced authentication session between the system and the enhanced authentication server associated with matching user identification information; and means for establishing, if the enhanced authentication is successfully completed, communicability between the system and each member of a group of the nodes associated with the matching user identification information.

9. The user authentication service according to claim 8, wherein the groups of nodes are represented in the entries by virtual local area network identifiers.

10. A method for authenticating prospective users of a communication network including a plurality of nodes each having a different network interface, comprising:

(a) accepting and storing, as associated entries for particular users, user identification information and groups of the nodes;

(b) accepting a log-in response on an end system in the network;

(c) comparing for a match the log-in response with the user identification information; and (d) if a match is found, establishing communicability between the system and each member of a group of the nodes associated with the matching user identification information.

11. A method for authenticating prospective users of a communication network including a plurality of nodes each having a different network interface, comprising:

(a) accepting and storing, as associated entries for particular users, user identification information, time restrictions and groups of the nodes, the time restrictions defining authorized times;

(b) accepting a log-in response on an end system in the network during a log-in attempt;

(c) comparing for a user match the log-in response with the user identification information;

(d) upon finding a user match, comparing for a time match the authorized times associated with the matching user identification information with the time of the log-in attempt;

(e) upon finding a time match, establishing communicability between said system and each member of a group of the nodes associated with the matching user identification information for the authorized time associated with the matching user identification information.

12. A method for authenticating prospective users of a communication network including a plurality of nodes each having a different network interface, comprising:

(a) accepting and storing, as associated entries for particular users, user identification information, groups of the nodes and enhanced authentication information, the enhanced authentication information identifying an enhanced authentication server operative in the network;

(b) accepting a log-in response on an end system in the network;

(c) comparing for a match the log-in response with the user identification information;

(d) if a match is found, conducting an enhanced authentication method between the system and the identified enhanced authentication server associated with the matching user identification information; and (e) if the enhanced authentication method is successfully completed, establishing communicability between the system and each member of a group of the nodes associated with the matching user identification information.

13. An authentication agent for a user authentication service for a communication network, comprising:

means for receiving a log-in response from an end system;

means for communicating the log-in response to an authentication server;

means for receiving authorized subnetwork information from the authentication server in response to the log-in response; and means for communicating the authorized subnetwork information to a processing means, the processing means applying the authorized subnetwork information to establish rules for communicability between the system and members of different groups of nodes in the network, wherein each node has a different network interface.

14. The authentication agent according to claim 13, further comprising:

means for receiving user status information from said authentication server in response to said log-in response; and means for communicating said user status information to said system.

15. The authentication agent according to claim 13, further comprising means for establishing a secure connection for communicating with said authentication server.

16. The authentication agent according to claim 15, wherein said secure connection is established through the exchange of authentication keys.

17. The authentication agent according to claim 13, further comprising means for terminating connectivity with said system after a configurable number of failed log-in attempts.

18. The authentication agent according to claim 13, wherein said authorized subnetwork information includes time restrictions defining an access period, and wherein said processing means is operative for abolishing the established rules when said access period expires.

19. The authentication agent according to claim 13, wherein said processing means is operative for abolishing the established rules if said system becomes disconnected from the network.

20. The authentication agent according to claim 13, wherein said processing means is operative for abolishing the established rules if said agent receives from said server a deactivation instruction for said system.

21. The authentication agent according to claim 13, wherein said processing means is operative for abolishing the established rules when said system fails to transmit packets for a predetermined length of time.

* * * * *

UNITED STATES PATENT AND TRADEMARK OFFICE
Certificate

Patent No. 6,070,243                                                                           Patented: May 30, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michele Wright Goodwin, Westlake Village, CA; Michael E. See, Chapel Hills, NC; John W. Bailey, Agoura Hills, CA; Charles L. Panza, Park City, Utah; Yuri Pikover, Malibu, CA; and Geoffrey C. Stone, Malibu, CA.

Signed and Sealed this First Day of April 2003.

ROBERT W. BEAUSOLIEL, JR.
*Supervisory Patent Examiner*
Art Unit 2184